US009501707B2

(12) United States Patent
Bulan et al.

(10) Patent No.: US 9,501,707 B2
(45) Date of Patent: Nov. 22, 2016

(54) METHOD AND SYSTEM FOR BOOTSTRAPPING AN OCR ENGINE FOR LICENSE PLATE RECOGNITION

(71) Applicant: Xerox Corporation, Norwalk, CT (US)

(72) Inventors: Orhan Bulan, Henrietta, NY (US); Claude Fillion, Rochester, NY (US); Aaron M. Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 33 days.

(21) Appl. No.: 14/688,255

(22) Filed: Apr. 16, 2015

(65) Prior Publication Data

US 2016/0307061 A1 Oct. 20, 2016

(51) Int. Cl.
*G06K 9/18* (2006.01)
*G06K 9/32* (2006.01)
*G06K 9/62* (2006.01)
*G06K 9/00* (2006.01)

(52) U.S. Cl.
CPC .......... *G06K 9/325* (2013.01); *G06K 9/00671* (2013.01); *G06K 9/18* (2013.01); *G06K 9/6269* (2013.01); *G06K 2209/15* (2013.01)

(58) Field of Classification Search
CPC .... G06K 9/00671; G06K 9/18; G06K 9/325; G06K 9/6269; G06K 2209/15
See application file for complete search history.

(56) References Cited

U.S. PATENT DOCUMENTS

| | | | |
|---|---|---|---|
| 6,026,177 A * | 2/2000 | Mong | G06K 9/3233 382/156 |
| 6,473,517 B1 | 10/2002 | Tyan et al. | |
| 6,553,131 B1 | 4/2003 | Neubauer et al. | |
| 6,982,654 B2 | 1/2006 | Rau et al. | |
| 7,480,411 B1 * | 1/2009 | Tzadok | G06K 9/03 358/1.11 |
| 8,447,112 B2 * | 5/2013 | Paul | G06K 9/00 382/105 |
| 8,483,440 B2 | 7/2013 | Fan et al. | |
| 8,588,470 B2 * | 11/2013 | Rodriguez Serrano | G06K 9/6217 382/105 |
| 8,644,561 B2 | 2/2014 | Burry et al. | |
| 8,737,690 B2 | 5/2014 | Bulan et al. | |
| 8,744,132 B2 | 6/2014 | Bulan et al. | |
| 8,855,436 B2 | 10/2014 | Bulan et al. | |
| 2009/0245573 A1 * | 10/2009 | Saptharishi | G06K 9/00771 382/103 |

(Continued)

OTHER PUBLICATIONS

Rodriguez-Serrano et al., "Data-Driven Vehicle Identification by Image Matching", Computer Vision—ECCV 2012. Workshops and Demonstrations, vol. 7584 of the series Lecture Notes in Computer Science pp. 536-545.*

(Continued)

*Primary Examiner* — Katrina Fujita
(74) *Attorney, Agent, or Firm* — Kermit D. Lopez; Luis M. Ortiz; Ortiz & Lopez, PLLC

(57) ABSTRACT

Methods and systems for bootstrapping an OCR engine for license plate recognition. One or more OCR engines can be trained utilizing purely synthetically generated characters. A subset of classifiers, which require augmentation with real examples, along how many real examples are required for each, can be identified. The OCR engine can then be deployed to the field with constraints on automation based on this analysis to operate in a "bootstrapping" period wherein some characters are automatically recognized while others are sent for human review. The previously determined number of real examples required for augmenting the subset of classifiers can be collected. Each subset of identified classifiers can then be retrained as the number of real examples required becomes available.

20 Claims, 9 Drawing Sheets

(56) References Cited

U.S. PATENT DOCUMENTS

| | | | |
|---|---|---|---|
| 2009/0263019 A1* | 10/2009 | Tzadok | G06K 9/6255 382/176 |
| 2013/0129151 A1* | 5/2013 | Rodriguez Serrano | G06K 9/6217 382/105 |
| 2013/0129152 A1* | 5/2013 | Rodriguez Serrano | G06K 9/6255 382/105 |
| 2013/0182910 A1* | 7/2013 | Burry | G06K 9/6279 382/105 |
| 2014/0079315 A1 | 3/2014 | Kozitsky et al. | |
| 2014/0177925 A1 | 6/2014 | Wu et al. | |
| 2014/0254879 A1 | 9/2014 | Smith | |
| 2014/0328518 A1* | 11/2014 | Kozitsky | G06K 9/2018 382/105 |
| 2014/0348391 A1* | 11/2014 | Schweid | G06K 9/623 382/105 |
| 2015/0063688 A1* | 3/2015 | Bhardwaj | G06K 9/18 382/159 |
| 2016/0203380 A1* | 7/2016 | Bulan | G06K 9/325 382/105 |

OTHER PUBLICATIONS

Nijhuis et al,. "A modular neural network classifier for the recognition of occluded characters in automatic license plate reading." Proceedings FLINS2002, 363-372.*

Du et al., "Automatic License Plate Recognition (ALPR): A State-of-the-Art Review", IEEE Transactions on Circuits and Systems for Video Technology, vol. 23, Iss. 2, 311-325.*

Chen et al., "Large-Scale Visual Font Recognition", 2014 IEEE Conference on Computer Vision and Pattern Recognition, 3598-3605.*

Zhu et al., "End-to-end system of license plate localization and recognition", Mar. 2015, . Electron. Imaging. 24(2), 023020, 1-18.*

Bala, R. et al., "Image simulation for automatic license plate recognition," Proc. SPIE 8305, Visual Information Processing and Communication III, 83050Z (Feb. 9, 2012), 9 pages.

Hoessler, H. et al., "Classifier training based on synthetically generated samples," Proceedings of the 5th International Conference on Computer Vision Systems (2007) Applied Computer Science Group, Bielefeld University, Germany, 10 pages.

* cited by examiner

METHOD AND SYSTEM FOR BOOTSTRAPPING AN OCR ENGINE FOR LICENSE PLATE RECOGNITION

TECHNICAL FIELD

Embodiments are generally related to the field of ALPR (Automated License Plate Recognition). Embodiments are additionally related to OCR (Optical Character Recognition) and image classification.

BACKGROUND OF THE INVENTION

ALPR is an image-processing approach that often functions as the core module of "intelligent" transportation infrastructure applications. License plate recognition techniques, such as ALPR, can be employed to identify a vehicle by automatically reading a license plate utilizing image processing, computer vision, and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations: locating the sub-image containing the license plate (i.e., plate localization), extracting images of individual characters (i.e., segmentation), and performing optical character recognition (OCR) on these character images. In order for OCR to achieve high accuracy, it is necessary to obtain properly segmented characters.

The ability to extract license plate information from images and/or videos is fundamental to the many transportation business. Having an ALPR solution can provide significant improvements for the efficiency and throughput for a number of transportation related business processes.

ALPR systems have been successfully rolled out in several U.S. States (e.g., CA, NY, etc.). Some ALPR modules involve training classifiers for character recognition, and are commonly employed after detecting a license plate in a license plate image and segmenting out the characters from the localized plate region. A classifier can be trained for each character in a one-vs-all fashion using samples collected from the site, wherein the collected samples are manually labeled by an operator. Considering the high accuracy (i.e., 99%) required for the overall recognition system, the classifiers are typically trained using on the order of ~1000 manually labeled samples per character. The substantial time and effort required for manual annotation of training images can result in excessive operational cost and overhead.

In order to address this problem, some techniques have been proposed for training classifiers based on synthetically generated samples. Instead of collecting samples from the site, training images are synthetically generated using the font and layout of a license plate of the State of interest. Examples of such approaches are disclosed in, for example: (1) H. Hoessler et al. "Classifier Training Based on Synthetically Generated Samples", *Proc. 5th International Conference on Computer Vision Systems,* 2007; and (2) Bala, Raja, et al. "Image Simulation for Automatic License Plate Recognition," *IS&T/SPIE Electronic Imaging*, International Society for Optics and Photonics, 2012, which are incorporated herein by reference.

FIG. 1, for example, depicts a block diagram of a prior art license plate synthesis workflow 10. The workflow 10 depicted in FIG. 1 includes a test overlay module operation or module 14, along with a character sequence generation operation of module 16. Data indicative of a blank license plate image 12 can be provided for text overlay via the text overlay module 14. Rendering effects (e.g., fonts, spacing, layout, shadow/emboss, etc) are also provided to the text overlay module 14. State rules for valid sequences can also be provided to the character sequence generation module 16. Example character sequences are shown at block 18 with respect to the character sequence generation operation 16. Output from the text overlap module 14 results in one or more license plates 19 with license plate numbers corresponding to, for example, the characters shown at block 18. An image distortion model that includes color-to-IR conversion, image noise, brightness, geometric distortions, etc., can also be fitted on synthesized images to mimic the impact of capturing vehicle plate images with a real video camera system.

While these methods eliminate much of the manual investment required for training, they usually result in deterioration in the classification accuracy. FIG. 2, for example, depicts a prior art graph 20 of accuracy-yield curves for classifiers trained using only synthetic and real images. Even though 2000 synthetic images are used per character in training, the accuracy at the same yield is significantly lower compared to classifiers trained with 1500 real samples per character.

When classifiers are trained by mixing synthetically generated images with real samples, the classification accuracy is recovered as shown in the prior art graph 30 depicted in FIG. 3. The mixing proportion and the number of real samples needed, however, change from site to site and are currently manually tuned by testing classifiers on a set of real samples. This manual process requires time and effort to both collect and annotate the real samples. The time required to gather a sufficient number of images along with annotation can delay the deployment of the automated solution for several months.

Up to this point, the performance of an OCR engine trained with only synthetic characters has been noticeably poor compared to one trained with real characters as shown in graph 20 of FIG. 2. The performance gap can be closed by testing on real examples, determining which labels are performing poorly, and updating the OCR classifier for these poor performing labels to better match the real world observation. Performance is further improved by supplementing the synthetic character images with real examples such as that shown in graph 30 of FIG. 3.

In order to support this iterative legacy process, thousands of real characters are typically required. For perspective, a well-trained OCR engine for a particular state with 36 labels requires ~54,000 real characters (1500 samples per label). For a mixed synthetic and real scenario, we need 100 samples per label or 3,600 characters. With a targeted method, as outlined in greater detail herein, we can reduce this number to ~300 examples.

The number of real world images that must be collected is typically much larger than the proportional number of character examples due to a non-uniform distribution of label appearance probability. This amplifies the discrepancy between the results achieved by the disclosed approach versus the baseline. A typical license plate has 7 characters so give a uniform distribution of appearance probability, we'd need 514 plates to obtain 3,600 characters. The actual distribution, however, is depicted in the example prior art graph 40 of FIG. 4, which plots probability data versus character label information. One would thus need to collect 6× the number of images to obtain 100 'X' examples compared to '1' example.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR method and system.

It is another aspect of the disclosed embodiments to provide for methods and systems for bootstrapping an OCR engine for license plate recognition.

The aforementioned aspects and other objectives and advantages can now be achieved as described herein. Methods and systems are disclosed for bootstrapping an OCR engine for license plate recognition. Such an approach can optimize both the performance and upfront investment/time-to-market for an ALPR system through a multi-step cycle that includes, for example, training the required OCR engines using purely synthetically generated characters; identifying the subset of classifiers which require augmentation with real examples, and how many real examples are required for each; and deploying the OCR engine to the field with constraints on automation based on this analysis and operating in a "bootstrapping" period wherein some characters can be automatically recognized while others are sent for human review. Additionally, such an approach involves collecting the previously determined number of real examples required for augmenting the subset of classifiers and retraining each subset of identified classifiers as the number of real examples required becomes available.

This approaches reduces the total manual annotation required for training classifiers in an ALPR system by leveraging synthetically generated character images (i.e., synthetic images) where possible, and augmenting as needed with the samples collected from the site (i.e., real samples). The proportion and number of real samples required for each character can be automatically determined.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
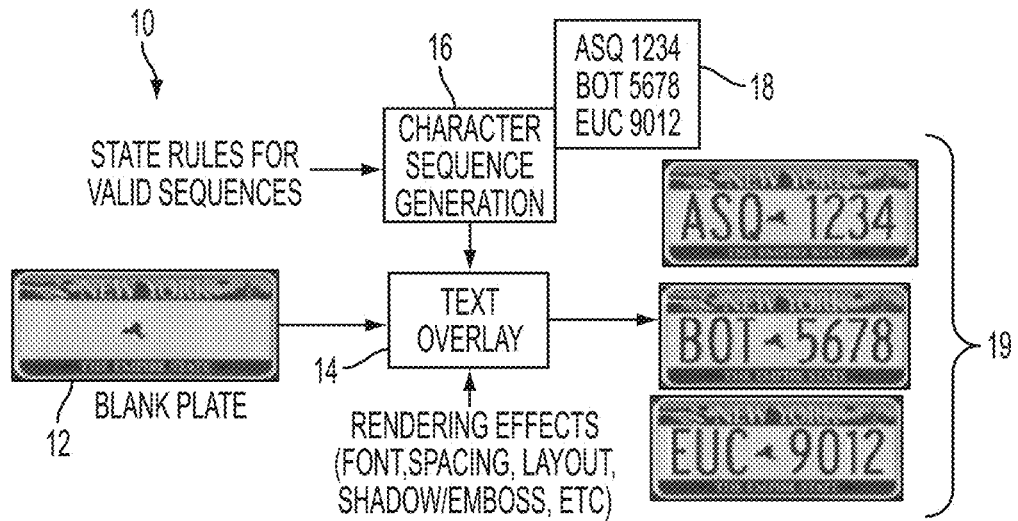
FIG. 1 illustrates a block diagram of a prior art license plate synthesis workflow.
Figure 2:
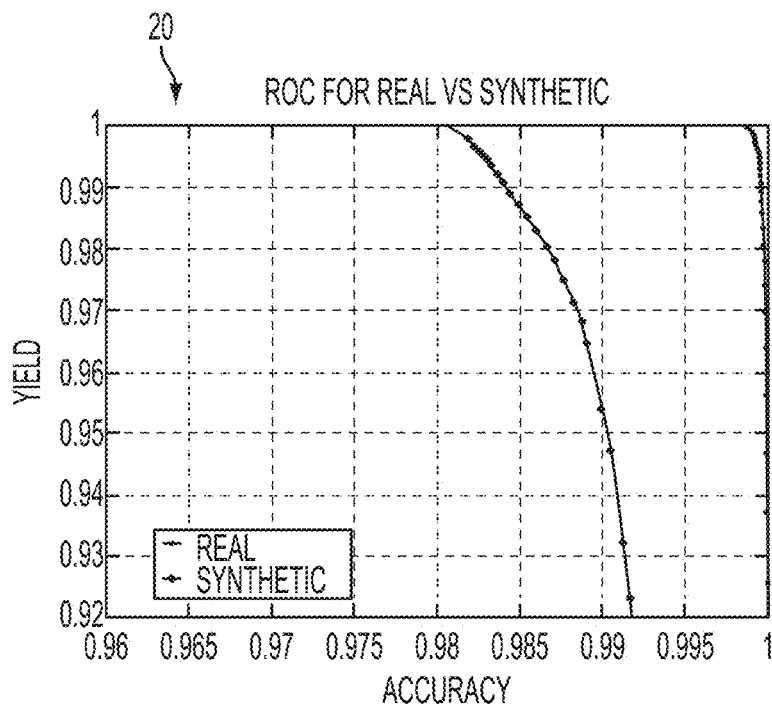
FIG. 2 illustrates a prior art graph depicting accuracy-yield curves for classifiers trained using only synthetic and real images.
Figure 3:
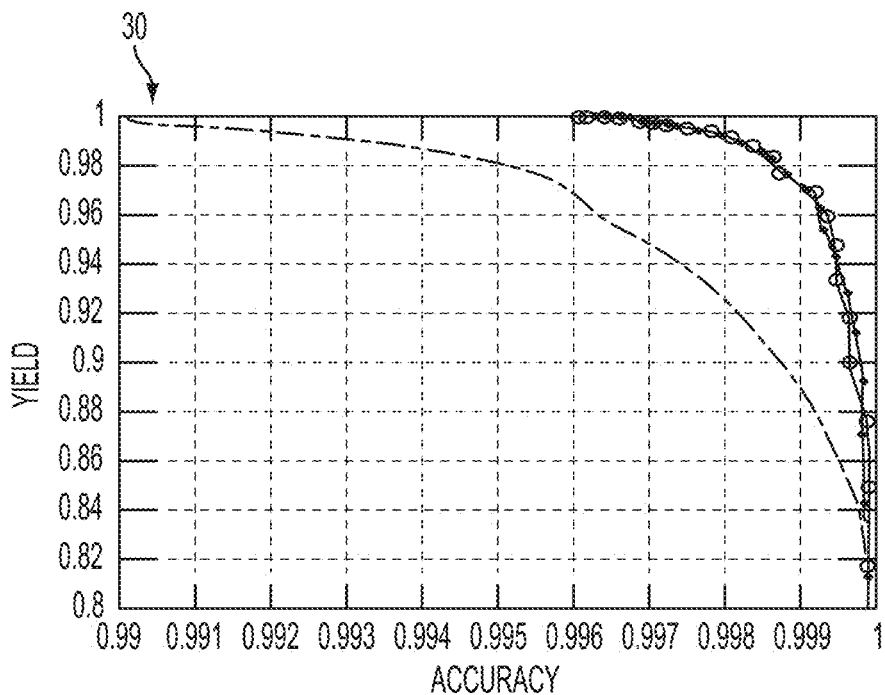
FIG. 3 illustrates a prior art graph depicting OCR performance for three sets of training data.
Figure 4:
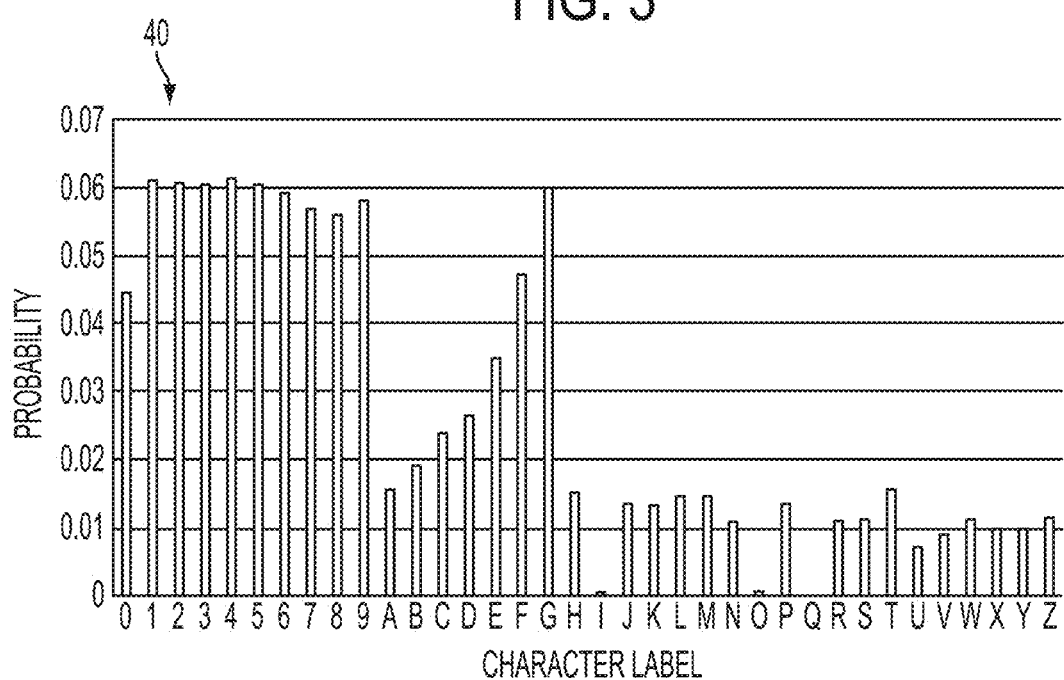
FIG. 4 illustrates a graph of label probability for a sample NY license plate font.
Figure 5:
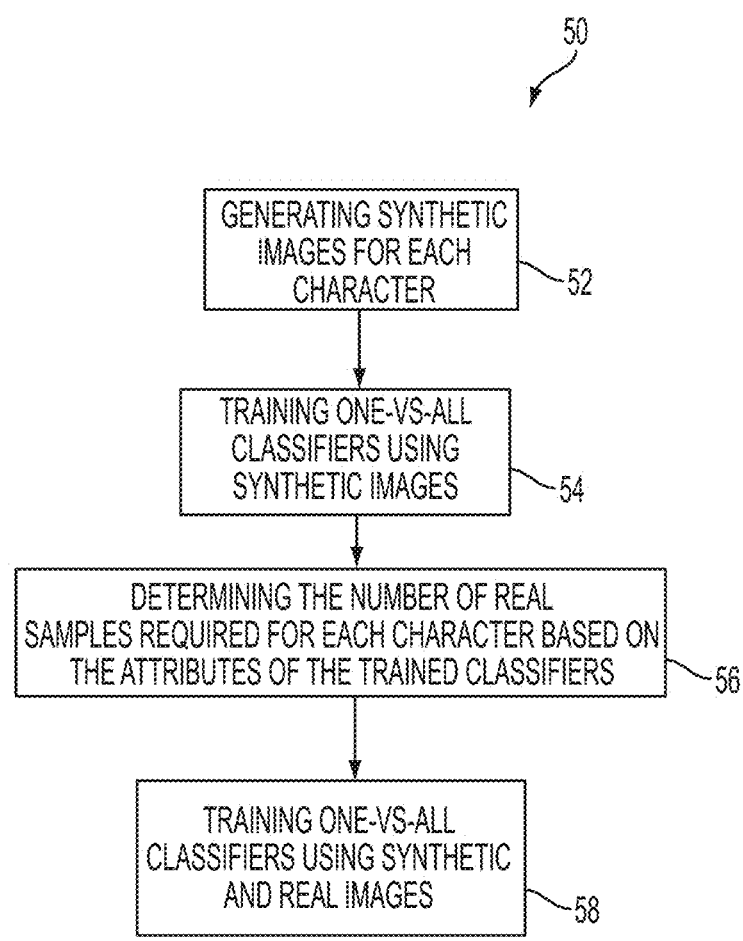
FIG. 5 illustrates a flowchart of operations depicting logical operational steps of a method for bootstrapping an OCR engine for license plate recognition, in accordance with a preferred embodiment.

FIG. 5 illustrates a flowchart of operations depicting logical operational steps of a method 50 for bootstrapping an OCR engine for license plate recognition, in accordance with a preferred embodiment. The method 50 shown in FIG. 5 can be employed to optimize, for example, both the performance and upfront investment/time-to-market for an ALPR system. This can be accomplished via a multi-step process comprised of a number of steps or logical operations. For example, as depicted at block 52 in FIG. 5, a step or logical operation can be provided for generating synthetic training examples for all the required symbols. In other words, synthetic images can be generated for each character in, for example, a license plate image. Thereafter, as depicted at block 54, a step or logical operation can be provided for training the required OCR engines using purely synthetically generated characters.

Next, as shown at block 56, a step or logical operation can be implemented for identifying the problematic characters based on: the attributes of the trained classifiers; determining the subset of classifiers which require augmentation with real examples and how many real examples are required for each; and the confidence thresholds and/or a "go/no go" for initial automation for each classifier.

The OCR engine can then be deployed "in the field" with the above constraints on automation based on this analysis and operates in a "bootstrapping" period wherein some characters are automatically recognized while others are sent for human review. The previously determined number of real examples required for augmenting the subset of classifiers can be collected. Then, as indicated at block 58, each of the subset of identified classifiers can be retrained as the number of real examples required becomes available. In other words, the step or logical operation shown at block 58 involves training one-vs-all classifiers using synthetic and real images.

Implementation of the method 50 depicted in FIG. 5 can reduce the total manual annotation required for training classifiers in an ALPR system by leveraging synthetically generated character images (i.e., synthetic images) where possible, and augmenting as needed with the samples collected from the site (i.e., real samples). The proportion and number of real samples required for each character is automatically determined.

The multi-step process/method 50 shown in FIG. 5 can be summarized as follows:
1) Generate synthetic training examples for all the required symbols;
2) Train the required OCR engines using purely synthetically generated characters;
3) Identify the problematic characters based on the attributes of the trained classifiers and determine:
   a. The subset of classifiers which require augmentation with real examples and how many real examples are required for each;
   b. Confidence thresholds and/or a "go/no go" for initial automation for each classifier;
4) Deploy the OCR engine to the field with the above constraints on automation based on this analysis and operating in a "bootstrapping" period wherein some characters can be automatically recognized while others are sent for human review;
5) Collect the previously determined number of real examples required for augmenting the subset of classifiers; and
6) Retrain each of the subset of identified classifiers as the number of real examples required becomes available.

After synthetic images are generated for each character, the step shown at block 54 involves training a one-vs-all classifier for each character using the synthetic images. The classifiers can be trained using many features and classifiers. The example features can be SMQT, LBP, SURF, SIFT, HOG, and Fisher vectors, etc. Example classifiers include but are not limited to: SVM, Neural Networks, SNOW, and Deep Belief Networks, etc. Here, there is no restriction in selecting the features or the classifier.

The step or logical operation of identifying the problematic characters based on the attributes of the trained classifiers and determining depicted at block 56 involves: 1) the number of real samples required to further improve each character classifier; and 2) the confidence threshold for automated conclusions for each character classifier during an initial operational mode. In this operation, both the number and proportion of real samples required for augmenting each character classifier, as well as the confidence threshold for initial operation, are automatically determined from the attributes of the classifiers trained using synthetic images.

Figure 6A:
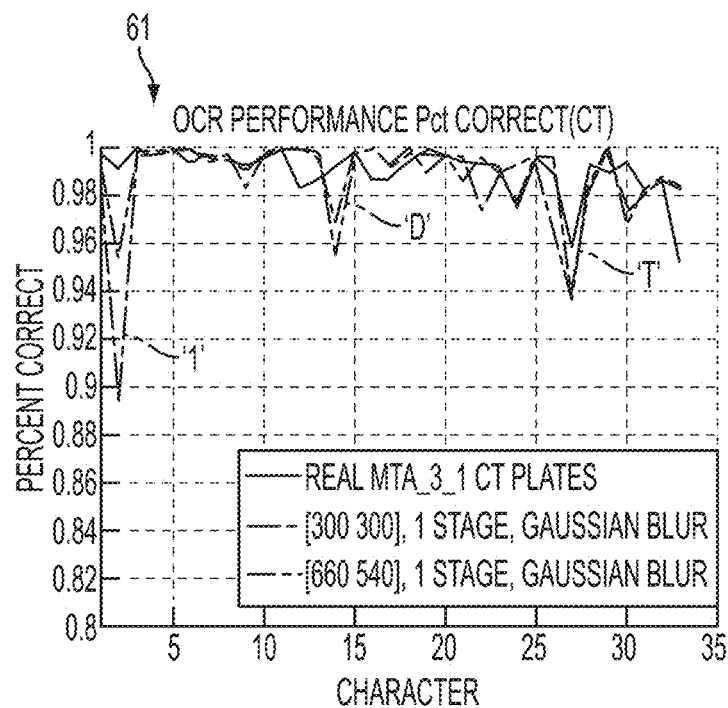
FIG. 6(a) illustrates a graph depicting the character level performance of problematic characters (i.e., characters that are difficult to classify) with respect to sample CT license plates, in accordance with an embodiment.
Figure 6B:
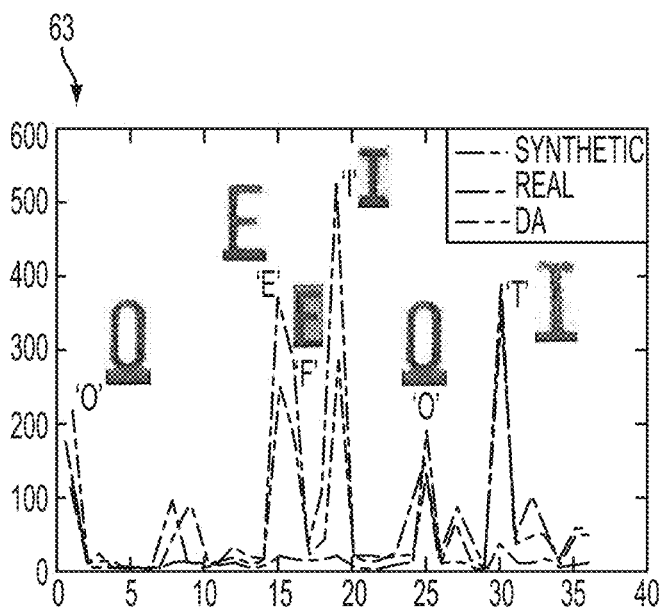
FIG. 6(b) illustrates a graph depicting the performance of problematic characters with respect to sample CA license plates, in accordance with an embodiment.

FIGS. 6(*a*) and 6(*b*) illustrate graphs 61, 63 depicting data indicative of the performance of classifiers trained with synthetic and real images across all 36 characters, in accordance with an example embodiment. While FIG. 6(*a*) shows the character-level performance for CT plates, FIG. 6(*b*) shows the performance for CA plates. Graphs 61, 63 indicate that training classifiers using only synthetic images shows similar performance as real images for most characters except a few. For example, for CT (Connecticut) plates the characters that result in significantly lower performance with synthetic images are '1', 'D', and 'T'. Similarly, the problematic characters for CA (California) plates are '0', 'E', 'F', 'I', 'O', and 'T'. Note that when the classifiers are trained with real images, the problematic characters are correctly classified but their classification accuracy is lower when the classifiers are trained with only synthetic images.

Figure 7:
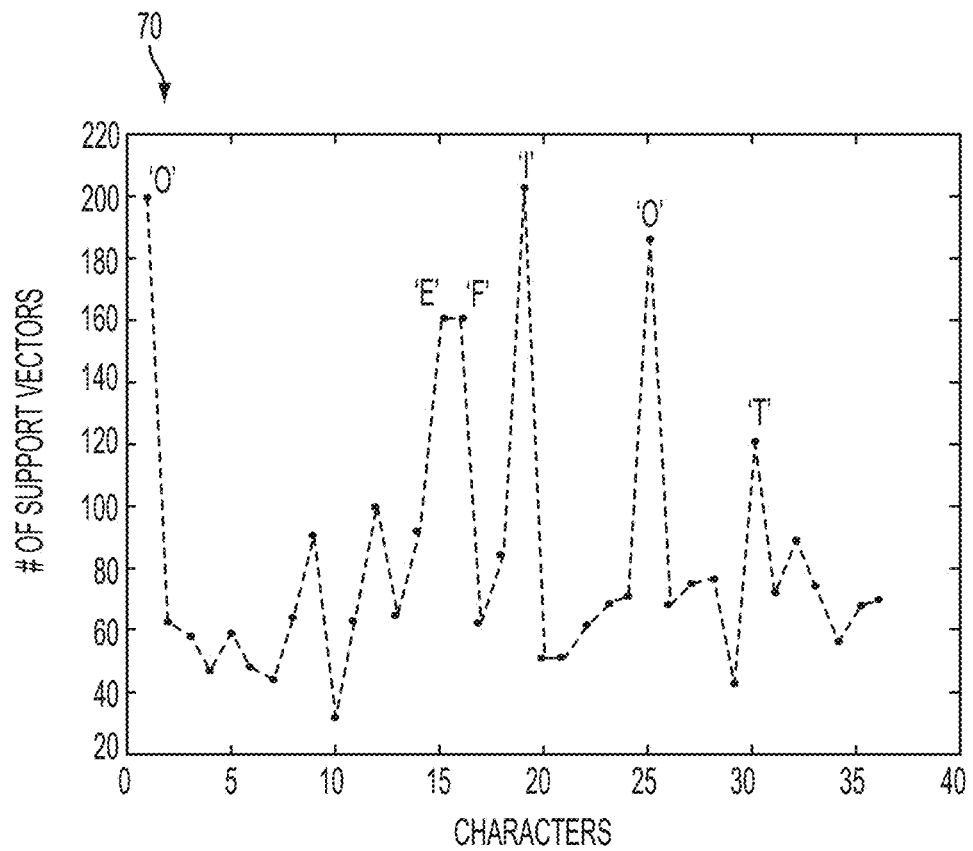
FIG. 7 illustrates a graph depicting number of support vectors across all characters for SVM classifiers (using HOG features) trained using synthetic images for CA plates, in accordance with an example embodiment.

Before collecting real samples from the site, problematic characters or labels can be identified based on the attributes of the classifiers trained using the synthetic images and hence, thereby minimize the time and effort required for collecting and labeling real samples. FIG. 7, for example, illustrates a graph 70 depicting the number of support vectors across all characters for SVM classifiers (using HOG features) trained using synthetic images, in accordance with an example embodiment.

Even though the training error is 0 for all 36 characters, the number of support vectors is notably higher for the problematic characters, which leads to higher error rates when tested with real images as shown, for example, by the data depicted in graph 63 of FIG. 6(*b*). Note that when these classifiers are tested with synthetic images, the performance loss in problematic characters is not observed. So, without the approach of the disclosed embodiments, it is difficult to determine where to invest further training resources. Using the disclosed embodiments, the difficulty of these characters becomes evident when the number of support vectors is observed for each character classifier.

Although support vectors are specific to SVM classifiers, the problematic characters can also be identified by attributes of other classifiers. For example, the number of iterations in training can be used as a metric to identify these problematic characters when SNOW is used as the classifier.

Once the problematic symbols are identified, we will collect more real samples for these problematic labels according to severity. If number of support vectors is used as a metric, then the number of real images required for a character can be calculated as:

$$r = \max\left(\left(\frac{x-\mu}{\sigma}\right)*N, 0\right)$$

wherein $\mu$ and $\sigma$ are the mean and standard deviation of the number of support of all the characters. Note that this way of calculating the number of real images required is not restrictive and other ways that assign more samples to problematic characters can also be used.

Figure 8:
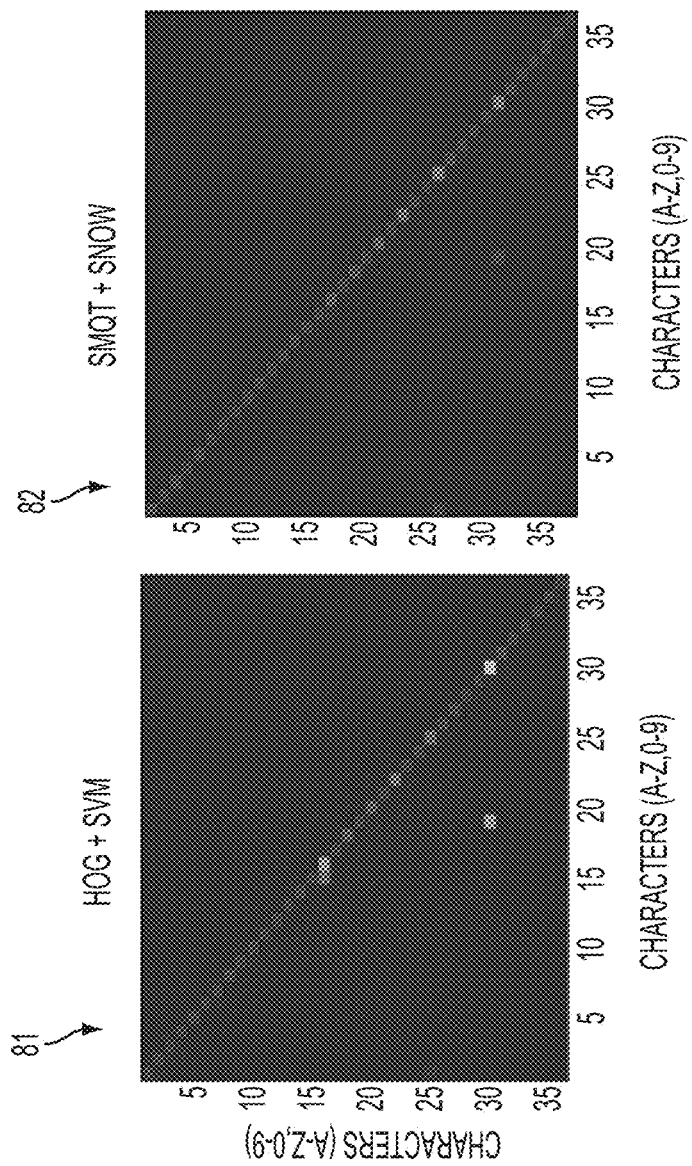
FIG. 8 illustrates graphs indicating that training the classifiers with different features and classifiers using synthetic images results in similar error maps, wherein errors mostly occur with problematic characters; in accordance with an example embodiment.

Finally, FIG. 8 illustrates respective error maps 81 and 82 of SVM and SNOW classifiers trained with synthetic images and tested on real images, in accordance with an example embodiment. Error maps 81, 82 indicate that training character classifiers with different features and classifiers using synthetic images result in similar error map where errors mostly occur with problematic characters. These errors can be recovered by including more real samples while training classifiers for problematic characters and less or no real samples for the "easy" (i.e., samples easy to classify) characters.

For the initial set of synthetically trained classifiers, most will perform quite well while only a few problematic symbols will have poor performance. Using the method outlined above, we can identify which classifiers are likely to perform well and which are likely to struggle. Leveraging this information, it is possible to determine which of the classifiers could be allowed to become fully operational without additional real training examples and which should not. This could be achieved with a simple gating function based on the number of support vectors, or additional training examples required:

$$A = \begin{cases} 1 & \text{if } r < T \\ 0 & \text{otherwise} \end{cases}$$

Here, A determines whether or not a given classifier should be automated, r is the number of additional real training examples required for acceptable performance (as calculated using the method above), and T is a predetermined threshold. Extending this technique beyond a simple threshold, one could calculate a confidence threshold for automation for each classifier based on the predicted additional training examples required:

$$C = 850 + 50\left(\max\left(\left(\frac{x-\mu}{\sigma}\right), 0\right)\right)$$

Here, synthetically trained classifiers that require larger numbers of support vectors are essentially restricted by requiring much larger confidence values for automation. This would limit their automation rate (requiring more human review), but would still allow some of the higher confidence (and thus more accurate) results to be generated automatically. Note that these are examples of how the confidence thresholds may be calculated and are not meant to be exhaustive or limiting.

As discussed earlier, the OCR engine can be deployed to the field in a "bootstrapping" model. In this situation, the OCR is allowed to operate under the constraints determined. Thus, only some of the classifiers are allowed to generate fully automated conclusions and each classifier may have its own predetermined confidence threshold. Note that during this bootstrapping mode, the automation rate will be somewhat lower than in the final fully operational mode. However, it is typical for ALPR systems to be deployed in a staged fashion. In fact, some ALPR implementations may have a timeline baked into their pricing to the customer that assumes certain levels of automation as the system performance is improved over time. The key here is that, without the disclosed embodiments, no known state of the art system today is able to become operational in any appreciable manner using purely synthetically trained classifiers. By using the disclosed approach, it is possible to achieve reasonable performance (maintaining accuracy while also achieving fairly high levels of automation) without requiring any real training examples.

Regarding collecting the required number of real samples in the field, as the system operates in bootstrap mode, most of the classifiers will perform normally (e.g., fully automated) while the subset of problematic classifiers will be constrained. Segmented character images for which no high confidence match is found are sent for human review. For those problematic characters that are either disabled (e.g., gated off) or for whom a much higher confidence threshold has been imposed, most or all of the real examples in the field for these symbols will be directed to human review.

Regarding the step of retraining the one-vs-all classifiers for each character using both synthetic and real images depicted at block 58 in FIG. 5, as the required number of real training examples are collected from the field, individual classifiers can be retrained using both synthetic and real examples. The classifiers can be trained using many possible features and classifiers. Example features are SMQT, LBP, SURF, SIFT, HOG, and Fisher vectors, etc., and example classifiers include SVM, Neural Networks, SNOW, and Deep Belief Networks, etc. Here, there is no restriction in selecting the features or the classifier. Once this retraining has occurred, these classifiers can then become fully operational, rather than running in bootstrap mode with modified confidence levels.

Note that the performance of the disclosed embodiments has been tested to demonstrate the benefit and feasibility of this approach. In one experiment, CA plates were utilized and 2500 real samples were collected for each character. 2000 synthetic images per character were also generated. 1500 out of 2500 real samples per character were used to train the classifier and the remaining 1000 samples were employed for testing. The images were scaled to 40×20 before feature extraction.

Figure 9:
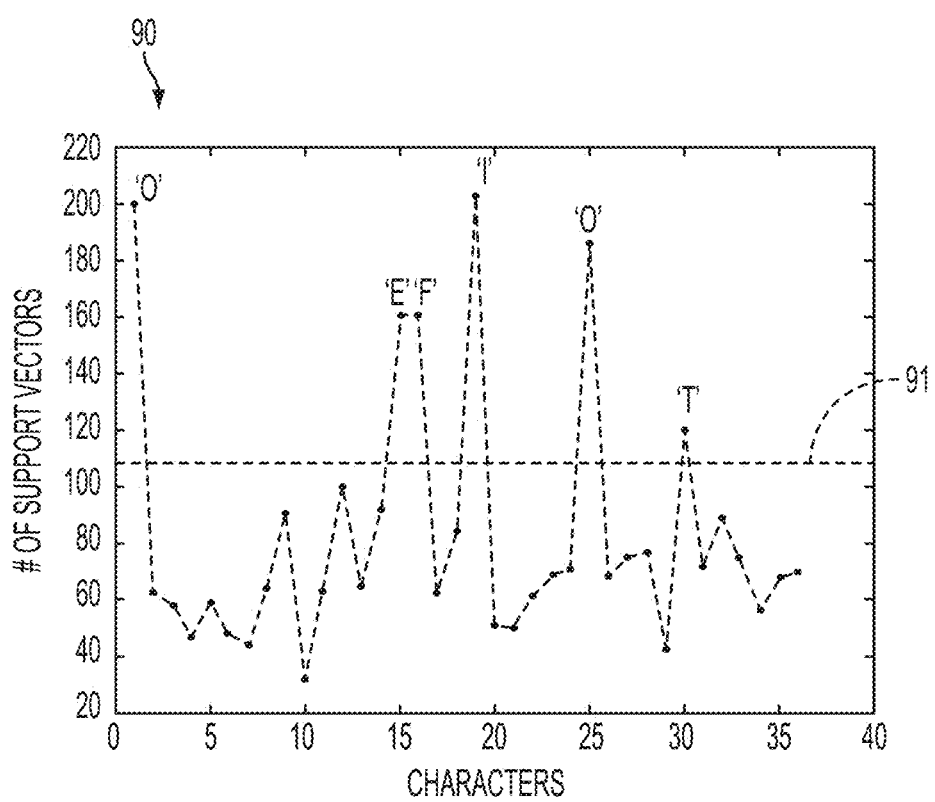
FIG. 9 illustrates a graph of data indicative of a number of support vectors across all characters for SVM classifiers (using HOG features) trained using synthetic images, in accordance with an example embodiment.

Using the synthetic images, the problematic characters are first identified. HOG features are then extracted and a linear SVM classifier trained in a one-vs-all fashion for each character. The number of support vectors is illustrated in graph 90 of FIG. 9 for each character. The problematic characters can then be identified whose number support vector is higher than $\rho+\sigma$, which are shown as line 91 in graph 90. These characters are listed as '0', 'E', 'F', 'I', 'O', and 'T'.

For the problematic characters, 100 real samples were included while having no real samples for the other characters and trained SNOW classifiers with 2000 synthetic images along with the real images included using SMQT features (in total 600 real images are used). For comparison purposes, the classifiers were also trained in three different settings. In the first setting, SNOW classifiers were trained using 2000 synthetic images per character. In the second setting, the SNOW classifiers were trained using 1500 real images per character. And in the third setting, the SNOW classifiers were trained using 100 real samples for all the characters along with 2000 synthetic images, which amount to 72000 synthetic and 3600 real images in total.

Figure 10:
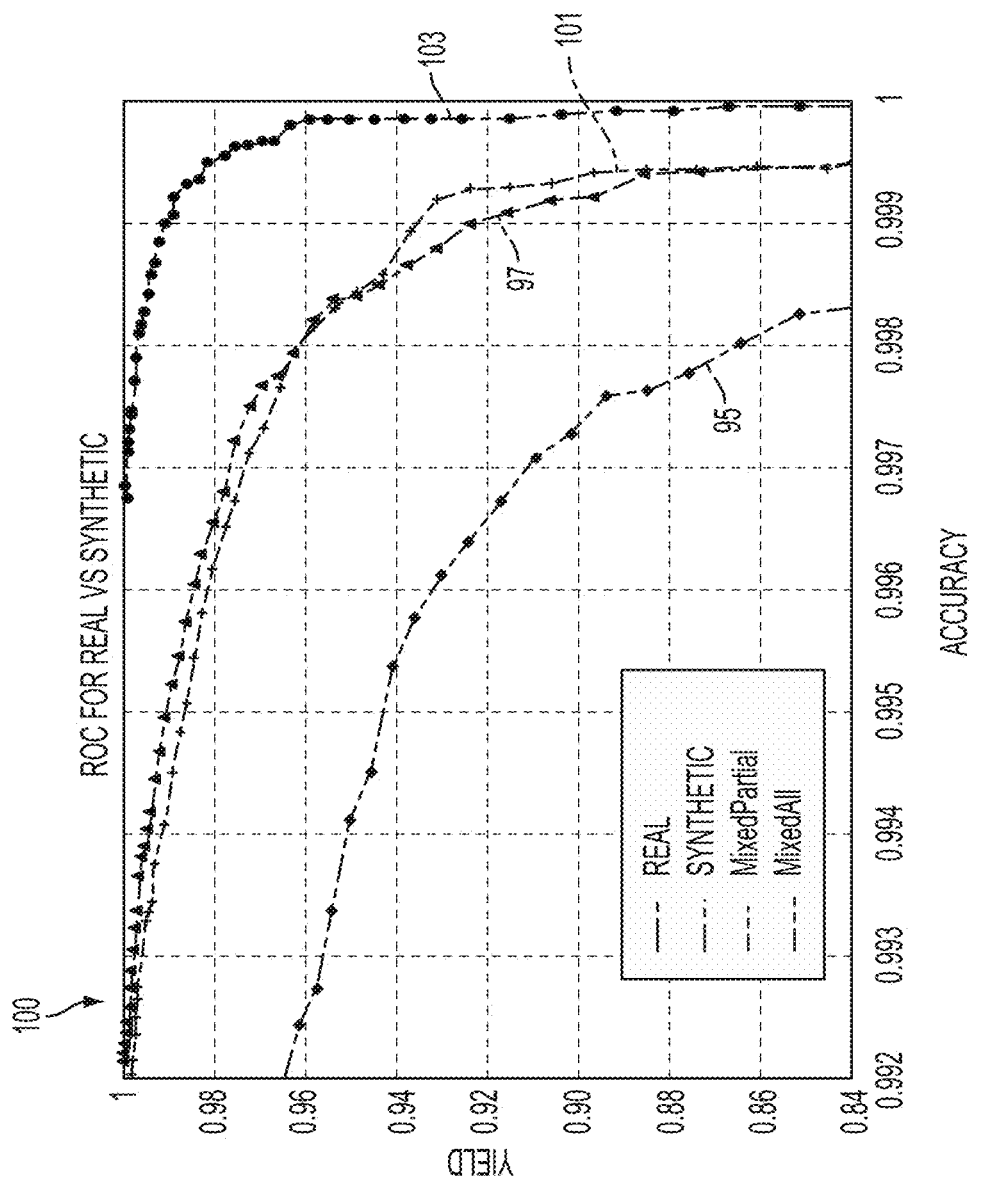
FIG. 10 illustrates a graph of accuracy-yield curves for training the SNOW classifier using different mix of real and synthetic images, in accordance with an example embodiment.

FIG. 10 illustrates a graph 100 of accuracy-yield curves 95, 97, 101, 103 for training the SNOW classifier using different mix of real and synthetic images, in accordance with an example embodiment. The best performance is obtained when the classifiers are trained with 1500 real images per character and the worst performance is when the classifiers are trained only using synthetic images. The disclosed approach (i.e., the curve 101 shown in graph 100) achieves similar performance while using $\frac{1}{6}^{th}$ of the real samples used in conventional methods (i.e., the curve 97 shown in graph 100), where the same number of real samples is used for all the characters. Note that the gap between the REAL and MixedPartial curves can be closed by using more real samples for the problematic characters.

Graph 100 demonstrates the performance for the CA character set where 6/36 characters are problematic. For most other states, the number of problematic characters is typically lower such as 3/36 for CT and thus an advantage of the disclosed approach is that $\frac{1}{12}^{th}$ the number of real images are required to achieve performance similar to the naïve implementation.

One of the unique features of the disclosed embodiments involves utilizing an uneven number of real samples for each character when a mix of real and synthetic images is used for training the OCR engine. Another unique feature involves identifying the problematic characters based on the attributes of the trained classifiers and determining the number of real samples required for each character. An additional unique feature includes automatically identifying operational constraints (e.g., individual confidence thresholds, which characters can be processed automatically, etc.) for an initial bootstrapping mode of in-field operation.

Advantages of the disclosed approach include a reduction in time and effort required for training an OCR engine in the deployment of ALPR systems in new jurisdictions, along with rendering the training investment more predictable, and reducing the time required to get a system operational in the field (since in-field capability can be provided even while bootstrapping). All of these advantages help to reduce upfront costs for field deployment.

A business need is also solved with the disclosed approach because it saves significant manual review cost. Currently, the gathering of images for OCR training takes 2-3 months and all images are manually reviewed. Any reduction in this time leads directly to profit.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network, e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 11:
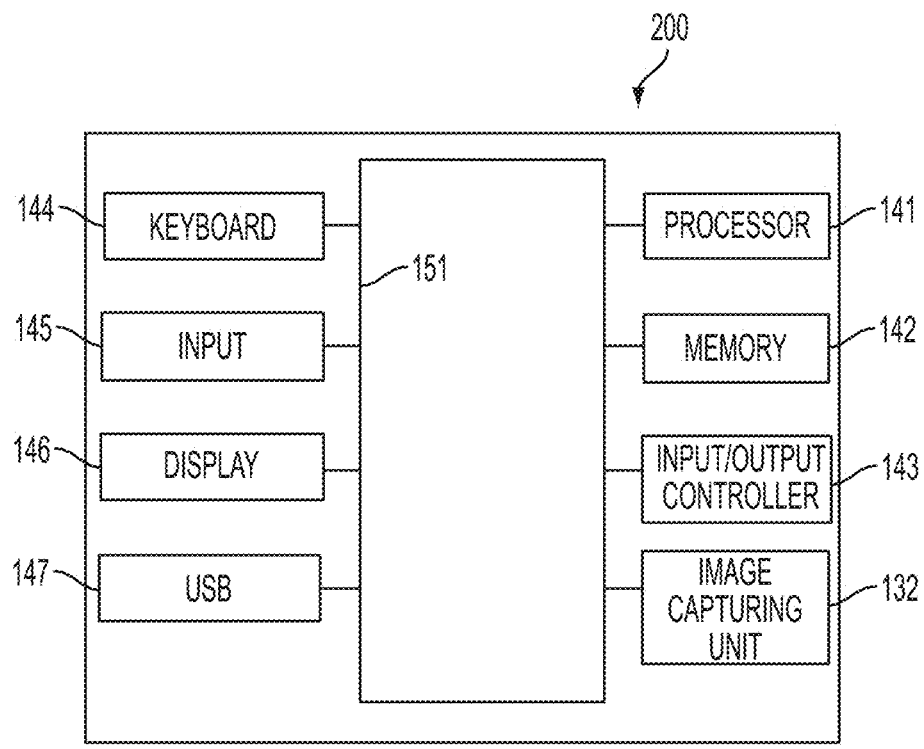
FIG. 11 illustrates a schematic view of a computer system, in accordance with an embodiment.
Figure 12:
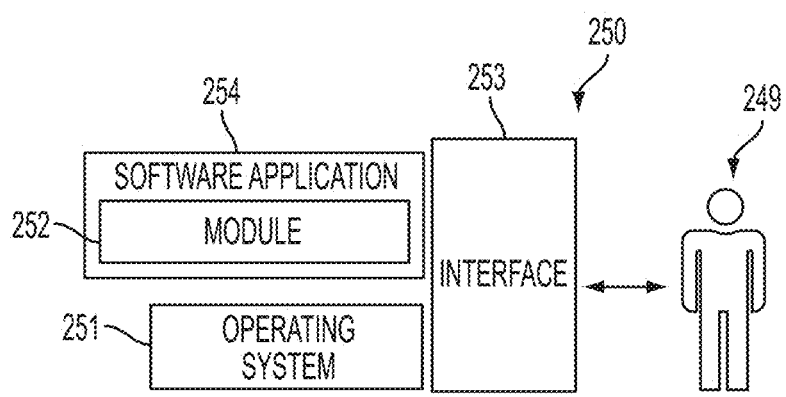
FIG. 12 illustrates a schematic view of a software system including a module, an operating system, and a user interface, in accordance with an embodiment.

FIGS. 11-12 are provided as exemplary diagrams of data-processing environments in which embodiments of the present invention may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 11, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. Note that in the context of an ALPR system, the image-capturing unit 132 may be implemented as an ALPR video camera.

FIG. 12 illustrates a computer software system 250 for directing the operation of the data-processing system 200 depicted in FIG. 11. Software application 254, stored for example, in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that can implement instructions or logical operations such as those, for example, described herein with respect to blocks 52, 54, 56, 58 of method 50 shown in FIG. 5.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 12 can thus implement instructions such as those shown, described, and illustrated herein with respect to blocks 52, 54, 56, and 58 of FIG. 5.

FIGS. 11-12 are intended as examples and not as architectural limitations of the disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments are disclosed. For example, in an embodiment, a method for optimizing an ALPR system can be implemented. Such a method can include steps or logical operations of, for example: generating synthetic images with respect to each character on a license plate image; training one or more classifiers utilizing the synthetic images; determining a number of samples of real images required for each character based on attributes of the classifier(s) training utilizing the synthetic images; and retraining the classifier(s) utilizing the synthetic images and the real images as the real images become available. In some embodiments, the aforementioned classifer(s) can be implemented as, for example, a one-vs-all classifier and/or an OCR engine.

In another embodiment, the step or operation for determining a number of samples of real images can further comprise a step or logical operation of identifying a subset of the classifier(s) requiring augmentation with the real images and a number of real images required for each subset of the classifier(s).

In yet another embodiment, steps or logical operations can be provided for deploying the OCR engine with constraints based on the training and retraining of the classifier(s); and operating the OCR engine in a bootstrapping period wherein some characters are automatically recognized while other characters are transmitted for human review.

In another embodiment, steps or logical operations can be provided for collecting a previously determined number of the real images required for augmenting each subset of the classifier(s); and retraining each subset of identified classifiers among the classifier(s) as a number of real examples of the real images required becomes available.

In another embodiment, a system for optimizing an ALPR system can be implemented. Such a system can include at least one processor; and a computer-usable medium embodying computer program code, the computer-usable medium capable of communicating with the processor(s). The computer program code can include instructions executable by the processor and configured, for example, for: generating synthetic images with respect to each character on a license plate image; training at least one classifier utilizing the synthetic images; determining a number of samples of real images required for each character based on attributes of the classifier(s) training utilizing the synthetic images; and retraining the classifier(s) utilizing the synthetic images and the real images as the real images become available.

In another embodiment, a system for optimizing an ALPR system can be implemented. Such a system can include, for example, at least one imaging capturing unit (e.g., a video camera) that captures a license plate image; at least one processor that communicates electronically with the image capturing unit(s); and a computer-usable medium embodying computer program code, the computer-usable medium capable of communicating with the processor(s). The computer program code can include instructions executable by the processor(s) and configured for: generating synthetic images with respect to each character on the license plate image; training at least one classifier utilizing the synthetic images; determining a number of samples of real images required for the each character based on attributes of the classifier(s) training utilizing the synthetic images; and retraining the classifier utilizing the synthetic images and the real images as the real images become available.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for optimizing an ALPR system, said method comprising:
   generating synthetic images with respect to each character on a license plate image;
   training at least one classifier utilizing said synthetic images;
   determining a number of samples of real images required for said each character based on attributes of said at least one classifier training utilizing said synthetic images; and
   retraining said at least one classifier utilizing said synthetic images and said real images as said real images become available.

2. The method of claim 1 wherein said at least one classifier comprises a one-vs-all classifier.

3. The method of claim 1 wherein said at least one classifier comprises an OCR engine.

4. The method of claim 3 further comprising:
   deploying said OCR engine with constraints based on said training and retraining of said at least one classifier; and
   operating said OCR engine in a bootstrapping period wherein some characters are automatically recognized while other characters are transmitted for human review.

5. The method of claim 1 wherein determining a number of samples of real images, further comprises: identifying a subset of said at least one classifier requiring augmentation with said real images and a number of real images required for each subset of said at least one classifier.

6. The method of claim 5 further comprising:
collecting a previously determined number of said real images required for augmenting said each subset of said at least one classifier; and
retraining said each subset of identified classifiers among said at least one classifier as a number of real examples of said real images required becomes available.

7. The method of claim 6 wherein said at least one classifier comprises a one-vs-all classifier.

8. The method of claim 6 wherein said at least one classifier comprises an OCR engine.

9. A system for optimizing an ALPR system, said system comprising:
at least one processor; and
a computer-usable medium embodying computer program code, said computer-usable medium capable of communicating with said at least one processor, said computer program code comprising instructions executable by said at least one processor and configured for:
generating synthetic images with respect to each character on a license plate image;
training at least one classifier utilizing said synthetic images;
determining a number of samples of real images required for said each character based on attributes of said at least one classifier training utilizing said synthetic images; and
retraining said at least one classifier utilizing said synthetic images and said real images as said real images become available.

10. The system of claim 9 wherein said at least one classifier comprises a one-vs-all classifier.

11. The system of claim 9 wherein said at least one classifier comprises an OCR engine.

12. The system of claim 9 wherein said instructions determining a number of samples of real mages, further comprise instructions for:
identifying a subset of said at least one classifier requiring augmentation with said real images and a number of real images required for each subset of said at least one classifier.

13. The system of claim 12 wherein said instructions are further configured for:
deploying said OCR engine with constraints based on said training and retraining of said at least one classifier; and
operating said OCR engine in a bootstrapping period wherein some characters are automatically recognized while other characters are transmitted for human review.

14. The system of claim 13 wherein said instructions are further configured for:
collecting a previously determined number of said real images required for augmenting said each subset of said at least one classifier; and
retraining said each subset of identified classifiers among said at least one classifier as a number of real examples of said real images required becomes available.

15. The system of claim 14 wherein said at least one classifier comprises a one-vs-all classifier.

16. The system of claim 14 wherein said at least one classifier comprises an OCR engine.

17. The system of claim 14 wherein said at least one classifier comprises at least one of: a one-vs-all classifier and an OCR engine.

18. A system for optimizing an ALPR system, said system comprising:
at least one imaging capturing unit that captures a license plate image;
at least one processor that communicates electronically with said at least one image capturing unit; and
a computer-usable medium embodying computer program code, said computer-usable medium capable of communicating with said at least one processor, said computer program code comprising instructions executable by said at least one processor and configured for:
generating synthetic images with respect to each character on said license plate image;
training at least one classifier utilizing said synthetic images;
determining a number of samples of real images required for said each character based on attributes of said at least one classifier training utilizing said synthetic images; and
retraining said at least one classifier utilizing said synthetic images and said real images as said real images become available.

19. The system of claim 18 wherein said instructions determining a number of samples of real images, further comprise instructions for:
identifying a subset of said at least one classifier requiring augmentation with said real images and a number of real images required for each subset of said at least one classifier.

20. The system of claim 18 wherein said instructions are further configured for:
deploying said OCR engine with constraints based on said training and retraining of said at least one classifier;
operating said OCR engine in a bootstrapping period wherein some characters are automatically recognized while other characters are transmitted for human review;
collecting a previously determined number of said real images required for augmenting said each subset of said at least one classifier; and
retraining said each subset of identified classifiers among said at least one classifier as a number of real examples of said real images required becomes available.

* * * * *